United States Patent
Mathiasson et al.

(10) Patent No.: US 9,638,078 B2
(45) Date of Patent: May 2, 2017

(54) VEHICLE AMBIENT AIR PURIFICATION ARRANGEMENT AND METHOD, AND A VEHICLE AND VEHICLE FLEET COMPRISING SUCH ARRANGEMENT

(71) Applicant: VOLVO CAR CORPORATION, Gothenburg (SE)

(72) Inventors: Hans Mathiasson, Torslanda (SE); Ichiro Sugioka, Newbury Park, CA (US); Lena Lonnqvist, Ljungskile (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/666,776

(22) Filed: Mar. 24, 2015

(65) Prior Publication Data
US 2015/0285112 A1    Oct. 8, 2015

(30) Foreign Application Priority Data
Apr. 2, 2014  (EP) ...................................... 14163170

(51) Int. Cl.
*F01N 3/021* (2006.01)
*F01N 3/22* (2006.01)
(Continued)

(52) U.S. Cl.
CPC ......... *F01N 3/021* (2013.01); *B01D 46/0019* (2013.01); *B01D 46/44* (2013.01);
(Continued)

(58) Field of Classification Search
CPC ... F01N 3/021; F01N 3/22; F01N 3/30; F01N 3/32; F01N 9/00; F01N 13/009; F01N 2290/06; F01N 2330/06; F01N 2590/11; F01N 2900/0414; F01N 2900/08; F01N 2900/12; B01D 46/0019; B01D 46/44; Y02T 10/20; Y02T 10/47; Y10S 903/904
See application file for complete search history.

(56) References Cited

U.S. PATENT DOCUMENTS 5,586,448 A    12/1996   Ikeda et al.
6,195,985 B1    3/2001   del Re et al.
(Continued)

FOREIGN PATENT DOCUMENTS

EP   1378642 A1   1/2004
FR   2819451 A1   7/2002
(Continued)

OTHER PUBLICATIONS

Barry Dalgleish, "Air Pollution—A Silent Killer," Feb. 19, 2014.*
(Continued)

*Primary Examiner* — Audrey K Bradley
(74) *Attorney, Agent, or Firm* — Brooks Kushman P.C.

(57) ABSTRACT

A vehicle ambient air purification arrangement, a vehicle, a vehicle fleet and a method for purifying air ambient to a vehicle are provided. The arrangement comprises an air conveying apparatus and a controller. The controller is arranged to control the air conveying apparatus to convey ambient air through ducts and filters of a vehicle exhaust gas treatment system in response to a determination that a combustion engine is inoperative and that a voltage supplied to the arrangement exceeds a threshold voltage.

21 Claims, 4 Drawing Sheets (51) Int. Cl.
*F01N 3/30* (2006.01)
*F01N 3/32* (2006.01)
*B01D 46/00* (2006.01)
*B01D 46/44* (2006.01)
*F01N 9/00* (2006.01)
*F01N 13/00* (2010.01)

(52) U.S. Cl.
CPC ............ *F01N 3/22* (2013.01); *F01N 3/30* (2013.01); *F01N 3/32* (2013.01); *F01N 9/00* (2013.01); *F01N 13/009* (2014.06); *F01N 2290/06* (2013.01); *F01N 2330/06* (2013.01); *F01N 2590/11* (2013.01); *F01N 2900/0414* (2013.01); *F01N 2900/08* (2013.01); *F01N 2900/12* (2013.01); *Y02T 10/20* (2013.01); *Y02T 10/47* (2013.01); *Y10S 903/904* (2013.01)

(56) References Cited

U.S. PATENT DOCUMENTS

| | | | |
|---|---|---|---|
| 6,361,579 B1* | 3/2002 | Itoh | B01D 53/92 422/171 |
| 6,647,712 B2 | 11/2003 | Hiller et al. | |
| 2007/0204601 A1* | 9/2007 | Ishii | B60K 6/48 60/295 |
| 2007/0221370 A1 | 9/2007 | Allen et al. | |
| 2009/0038301 A1 | 2/2009 | Oi | |
| 2009/0165479 A1 | 7/2009 | Lin et al. | |
| 2009/0286459 A1 | 11/2009 | Major et al. | |
| 2011/0072799 A1 | 3/2011 | Bidner et al. | |
| 2012/0227382 A1* | 9/2012 | Bidner | F01N 3/30 60/274 |

FOREIGN PATENT DOCUMENTS

FR 2976856 A1 12/2012
WO 2007023340 A1 3/2007

OTHER PUBLICATIONS

Extended European Search Report Dated Sep. 18, 2014, Application No. 14163170.5-1606, Applicant Volvo Car Corporation, 7 Pages.
U.S. Appl. No. 14/666,974, filed Mar. 24, 2015, 24 Pages.
Extended European Search Report Dated Sep. 25, 2014, Application No. 14163171.3-1756, Applicant Volvo Car Corporation, 5 Pages.

* cited by examiner

VEHICLE AMBIENT AIR PURIFICATION ARRANGEMENT AND METHOD, AND A VEHICLE AND VEHICLE FLEET COMPRISING SUCH ARRANGEMENT

CROSS-REFERENCE TO RELATED APPLICATIONS

This application claims foreign priority benefits under 35 U.S.C. §119(a)-(d) to European patent application number EP 14163170.5, filed Apr. 2, 2014, which is incorporated by reference in its entirety.

TECHNICAL FIELD

Embodiments herein relate to a vehicle ambient air purification arrangement and to a vehicle comprising a vehicle ambient air purification arrangement. Embodiments herein also relate to a fleet of vehicles, wherein each vehicle in the fleet comprises a vehicle ambient air purification arrangement. Embodiments herein further relate to a method for purifying air ambient to a vehicle.

BACKGROUND

Air pollution in form of particulates is a major concern in the world today and the amount of particulates in the air is increasing in many places. Some particulates occur naturally in the air, originating e.g. from volcanos, dust storms and forest/grassland fires. Some particulates are caused by human activities, such as burning of fossil fuel and industrial processes. Increased levels of particulates in the air are linked to several health hazards.

The levels of particulates in the air may be particularly high in large cities with many inhabitants, vehicles and industries. Legislation in some countries relates both to the emission allowed for a certain type of pollution and for the ambient concentration of particulates. For example, the European Union has established the European emission standards, which include limits for particulates in the air. Particles with a diameter of 10 micrometers or less are often referred to as PM10 and particles with a diameter of 2.5 micrometers or less are often referred to as PM2.5.

In order to reduce the levels of particulates in the air, some countries regulate the amount of particulates allowed in exhaust gas emitted from vehicles. In order to pass the regulations, vehicles equipped with combustion engines must often be provided with a particulate filter as a part of a vehicle exhaust gas treatment system. The particulate filter may remove most of the particulates, such as soot, when the exhaust air from the combustion engine passes the particulate filter. Some particulate filters are single-use filters, intended for disposal and replacement once full of accumulated soot. Some particulate filters are designed to burn off the accumulated particulates, e.g. passively through use of a catalyst, or actively by active means such as a fuel burner that heats the particulate filter to particulate combustion temperatures. In some vehicles the exhaust gas temperature may be temporarily increased such that particulates in the particulate filter are combusted. Such particulate filters may be referred to as regenerable particle filters. A particulate filter may be e.g., a diesel particulate filter (DPF) or a petrol/gasoline particulate filter (GPF).

Some particulate filters of today are very efficient and may collect a large amount of soot and small particulates in air passing the filter. However, it is still desirable to further reduce the amount of particulates in the air.

SUMMARY

Embodiments herein aim to provide a vehicle ambient air purification arrangement which reduces the amounts of particulates in the air.

According to an embodiment, this is provided by a vehicle ambient air purification arrangement in a vehicle comprising a combustion engine and an associated exhaust gas treatment system having ducts and one or more filters therein for purification of exhaust gas, wherein the arrangement comprises: an air conveying apparatus and a controller, where the controller further is arranged to control the air conveying apparatus to convey ambient air through the ducts and filters of the exhaust gas treatment system in response to a determination that the combustion engine is inoperative and that a voltage supplied to the arrangement from an electricity supply source exceeds a threshold voltage.

Since the controller is arranged to control the air conveying apparatus to convey ambient air through the ducts and filters of the exhaust gas treatment system in response to a determination that the combustion engine is inoperative and that a voltage supplied to the arrangement from an electricity supply source exceeds a threshold voltage, ambient air is purified by the arrangement when the engine is shut off and electricity is supplied to the arrangement.

Thus, when the vehicle is parked and has access to electricity, the air conveying apparatus convey ambient air through one or more filters in order to collect air particulates, soot, etc. in the one or more filters. The vehicle ambient air purification arrangement acts as a pollution reduction device when the vehicle is parked.

The ambient air which has passed the arrangement therefore has a significantly lower amount of particulates than air which has not passed the arrangement. Thanks to this arrangement, the filters can collect particulates from the air, not only when the vehicle is driven, but also when the vehicle is parked. Since many vehicles are parked more than they are driven, the filters may be actively used for a considerably larger amount of time compared to arrangements which purify e.g., exhaust gas only when the vehicle is driven.

Thus, hereby is provided a vehicle ambient air purification arrangement, reducing the shortcomings and/or drawbacks associated with prior art solutions.

According to some embodiments, the controller is arranged to determine if the electricity supply source is a power grid, and further arranged to activate the air conveying apparatus if it is determined that the arrangement is connected to the power grid.

Since the controller is arranged to determine if the electricity supply source is a power grid, and further arranged to activate the air conveying apparatus if it is determined that the arrangement is connected to this power grid, it is ensured that the vehicle ambient air purification arrangement receives sufficient electricity to function properly.

According to some embodiments, the controller is connected to an electric hybrid system comprising at least one battery which is chargeable via a power grid, and in that the controller is arranged to activate the air conveying apparatus if it is determined that the at least one battery is being charged.

Since the controller is connected to an electric hybrid system comprising at least one battery which is chargeable via a power grid, and in that the controller is arranged to activate the air conveying apparatus if it is determined that the at least one battery is being charged, the electricity from the power grid is simultaneously used both to charge the vehicle battery and to provide the ambient air purification arrangement with electricity. A user that arranges the vehicle to be charged therefore simultaneously allows the ambient air purification arrangement to be activated. Thus, no additional effort from the user is necessary. The battery may be charged via a plug-in system, i.e., where the battery is charged via cable, or cable-free, e.g., via induction.

According to some embodiments, the controller is connected to an electric hybrid system comprising and at least one of a solar power generator, arranged to convert solar energy into electrical energy and a wind power generator which is arranged to convert wind energy into electrical energy, and at least one battery which is chargeable via the power generator The controller is arranged to activate the air conveying apparatus if it is determined that the at least one battery is being charged.

Since the controller is arranged to activate the air conveying apparatus if it is determined that the at least one battery is being charged via the power generator, solar energy and/or wind energy is used to provide the ambient air purification arrangement with electricity. Hereby an environmental net gain is further enhanced.

According to some embodiments, the host vehicle exhaust gas treatment system further comprises at least one air intake and at least one air outlet, and the air conveying apparatus and a particulate filter are arranged between the at least one air intake and the at least one air outlet, and the controller is arranged to control the air conveying apparatus to convey the ambient air through the vehicle exhaust gas treatment system from the at least one air intake to the at least one air outlet through the particulate filter, where the particulate filter is configured to collect at least a part of the particles in the ambient air when the ambient air is conveyed through the particulate filter.

Since the controller is arranged to control the air conveying apparatus to convey the ambient air through the vehicle exhaust gas treatment system from the at least one air intake to the at least one air outlet through the particulate filter, the particulate filter can collect at least a part of the particles in the ambient air when the ambient air is conveyed through the particulate filter. The at least one air intake may be an existing vehicle air intake, otherwise arranged to provide air to the vehicle engine. The at least one air outlet may be a separate air outlet or an existing exhaust pipe outlet.

According to some embodiments, the particulate filter is a ceramic particulate filter, arranged to collect at least a part of the air particles in the exhaust gas from the host vehicle combustion engine.

Since the particulate filter is a ceramic particulate filter, arranged to collect at least a part of the air particles in the exhaust gas from the host vehicle combustion engine, the particles are collected in a very efficient manner.

According to some embodiments, the arrangement further comprises a valve arranged between the air intake and the particulate filter, where the controller is arranged to selectively control the valve to let the ambient air from the air intake flow through the particulate filter either via the host vehicle combustion engine, or via a duct which is arranged to bypass the host vehicle combustion engine.

Since the controller is arranged to selectively control the valve to let the ambient air from the air intake flow through the particulate filter either via the host vehicle combustion engine, or via a duct which is arranged to bypass the host vehicle combustion engine, an efficient arrangement is achieved. The valve may be arranged to let the ambient air flow via the combustion engine when the engine is running and via the bypass duct when the vehicle is parked. Hereby the arrangement can also be retroactively fitted to vehicles without any ambient air purification arrangement.

According to some embodiments, the arrangement further comprises a separate dedicated air intake.

Since a parked vehicle is subject to other air/wind-conditions than a vehicle which is driven, a separate dedicated air intake may be optimized to function as an air intake that is used when the vehicle is parked.

According to some embodiments, the arrangement further comprises a separate particle separator arranged between the air intake and the particulate filter.

Since the arrangement further comprises a separate particle separator arranged between the air intake and the particulate filter, some particles may be separated from the incoming ambient air before reaching the one or more filters. For example, a particle separator arranged as an air filter, cyclone and/or centrifuge may separate particles such as sand and dust before they reach a regenerable particulate filter. Hereby sand and other non-regenerable objects are prevented from reaching the particulate filter.

Embodiments herein also aim to provide a vehicle comprising a vehicle ambient air purification arrangement which reduces the amounts of particulates in the air.

According to some embodiments, this is provided by a vehicle comprising a vehicle ambient air purification arrangement according to embodiments disclosed herein.

Since the vehicle comprises a vehicle ambient air purification arrangement according to embodiments disclosed herein, the amounts of particulates in the air is reduced.

Thus, hereby is provided a vehicle which reduces the amounts of particulates in the air.

Embodiments herein also aim to provide a vehicle fleet comprising a plurality of vehicles which reduce the amounts of particulates in the air.

According to some embodiments, this is provided by a vehicle fleet comprising a plurality of vehicles according to embodiments described herein.

Since the vehicle fleet comprises a plurality of vehicles according to embodiments described herein, the amount of particulates in the air is reduced. A fleet of vehicles, in which each vehicle is equipped with an air purification arrangement, is capable of considerably reducing the amount of particles in an area where the vehicle fleet is parked.

Embodiments herein also aim to provide a method for purifying air ambient to a vehicle without the shortcomings or drawbacks described above.

According to some embodiments, this is provided by a method for purifying air ambient to a vehicle by a vehicle ambient air purification arrangement in a vehicle comprising a combustion engine and an associated exhaust gas treatment system having ducts and one or more filters therein for purification of exhaust gas, wherein the arrangement comprises an air conveying apparatus and a controller and in that the method comprises:

determining, by the controller, that the combustion engine is inoperative, determining, by the controller, that a voltage supplied to the arrangement from an electricity supply source exceeds a threshold voltage, controlling the air conveying apparatus to convey ambient air through the ducts and filters of the exhaust gas treatment system if the combustion engine is inoperative and the voltage supplied to the arrangement exceeds a threshold voltage.

Since the method comprises: determining that the combustion engine is inoperative, determining that a voltage supplied to the arrangement exceeds a threshold voltage and controlling the air conveying apparatus to convey ambient air through the ducts and filters of the exhaust gas treatment system if the engine is inoperative and the voltage supplied to the arrangement exceeds a threshold voltage, ambient air is efficiently purified by the method.

Further features of, and advantages with, the embodiments herein will become apparent when studying the appended claims and the following detailed description.

BRIEF DESCRIPTION OF THE DRAWINGS

The various aspects of embodiments herein, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which exemplifying embodiments are shown. Like numbers refer to like elements throughout. Well-known functions or constructions will not necessarily be described in detail for brevity and/or clarity.

Figure 1:
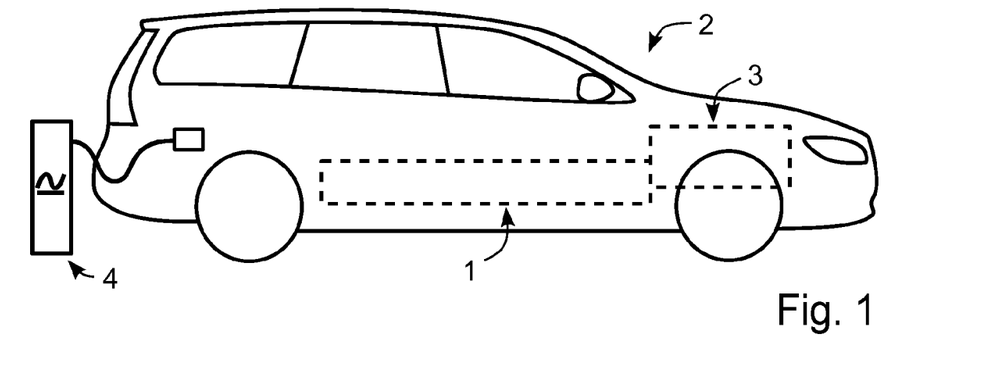
FIG. 1 illustrates a vehicle and a vehicle ambient air purification arrangement according to some embodiments.

FIG. 1 illustrates a vehicle ambient air purification arrangement 1 according to some embodiments. The arrangement 1 is arranged in a vehicle 2 equipped with a combustion engine 3. According to some embodiments the vehicle 2 or systems thereof is arranged to be connected to an electrical supply source 4, such as a power grid. If the vehicle 2 is an electric hybrid vehicle with batteries, such batteries may be charged via the electrical supply source 4. In FIG. 1 the vehicle 2 is supplied with electricity from the electrical supply source 4 via a cable, but in other embodiments the vehicle 2 may be supplied with electricity e.g., by induction. In some embodiments the electricity supply source 4 may be a power generator, possibly driven by solar energy and/or wind energy.

Figure 2:
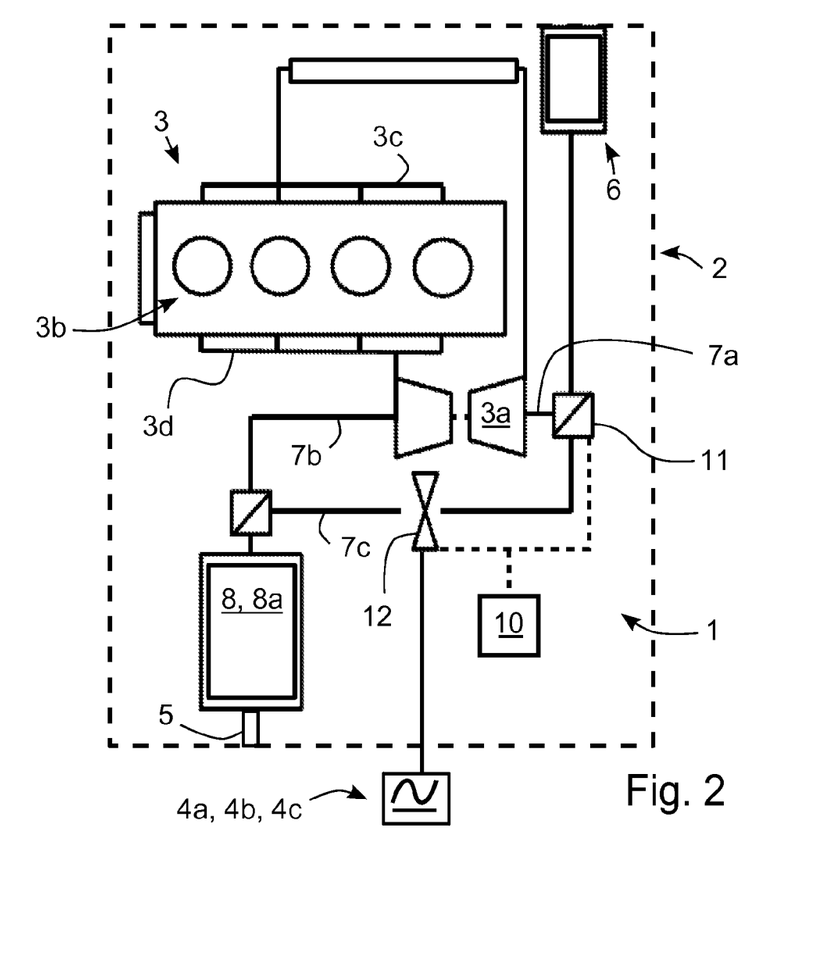
FIG. 2 illustrates a vehicle and a vehicle ambient air purification arrangement according to some other embodiments.

In FIG. 2 a vehicle 2 with a vehicle ambient air purification arrangement 1 and a combustion engine 3 is illustrated. In the illustrated embodiment the combustion engine 3 comprises a turbocharger 3a and cylinders 3b, but in other embodiments the combustion engine 3 is arranged without any turbocharger. In some embodiments the combustion engine 3 comprises a supercharger which may increase the airflow to the cylinders 3b of the combustion engine 3.

The combustion engine 3 is further provided with an air intake manifold 3c and an air outlet manifold 3d. The air manifolds 3c, 3d leads air to/from the cylinders 3b when the combustion engine 3 is running Air may flow between the turbocharger 3a and the cylinders 3b in a known manner. Air, air-gas-mixture and exhaust gas may be transported in ducts which interconnects the different parts of the combustion engine 3, and any air intakes, air outlets, exhaust gas treatment systems and other air/gas systems described in embodiments herein.

When the combustion engine 3 is running, ambient air is conveyed to the cylinders 3b via an air intake 6. If the vehicle 2 is equipped with a turbocharger and/or supercharger, the incoming air will pass the turbocharger/supercharger before reaching the cylinders 3b. The air intake 6 may be arranged in a front part of the vehicle 2, e.g., in or near a grille or bumper of the vehicle 2. Ambient air will then easily flow into the air intake 6 due to a difference in velocity between the vehicle 2 and the ambient air. The air from the air intake 6 is distributed to the combustion engine 3 in a first flow path 7a.

The air is mixed with fuel, such as gasoline or diesel, in the cylinders 3b. The air/fuel mixture is then controlled to combust in the cylinders 3b. Pistons arranged in the one or more cylinders 3b may transfer the energy from the combustion process to a vehicle drivetrain in a known manner, such that the vehicle 2 may be put in motion.

The combusted air/fuel mix leaves the engine 3 as exhaust fumes in a second flow path 7b. The exhaust fumes in the second flow path 7b are led to one or more filters 8. The filter 8 may be a particulate filter 8a, arranged to collect particulates and soot in the exhaust gas. The ducts and/or filters after the combustion engine 3 may be referred to as an exhaust gas treatment system.

In the FIG. 2 embodiment, a controller 10 is arranged to control a valve 11 and an air conveying apparatus 12. As illustrated in FIG. 2, the valve 11 will be arranged between the air intake 6 and the combustion engine 3. The air conveying apparatus 12 will be arranged between the valve 11 and the filter 8.

The controller 10 will control the valve 11 to open and/or close, such that air from the air intake 6 will flow between the air intake 6 and the filter 8 via the combustion engine 3 or without passing the combustion engine 3. In FIG. 2, the air may pass the combustion engine 3 via flow paths 7a and 7b. As illustrated, the controller 10 may also control the valve 11 to bypass the engine 3, and instead direct the air to flow to the filter 8 via a third flow path 7c. The third flow path 7c may also be referred to as a bypass flow path. A duct for the third flow path may be referred to as a bypass duct.

In some embodiments, no third flow path 7c is arranged between the air intake 6 and the filter 8. The air conveying apparatus 12 may then be arranged in any position from which it can convey incoming air through the ducts and filter 8. For example, the air conveying apparatus 12 may be arranged after the air intake 6, in the first flow path 7a or in the second flow path 7b. The air conveying apparatus 12 will then convey the air via at least some parts of the combustion engine 3.

The air conveying apparatus 12 may be configured as suitable means for drawing/pushing/conveying air through the ducts and filters 8, such as a pump, engine or air-fan of any kind. The air conveying apparatus 12 may alternatively be arranged in the form of a turbocharger or a mechanical or electrical compressor.

The controller 10 is configured to determine if the combustion engine 3 is operative or not. The controller 10 is also configured to determine if a voltage supplied to the vehicle ambient air purification arrangement 1 exceeds a threshold voltage. Many vehicles comprise a 12V-electrical system. However, the threshold voltage may be freely selected. For example, the threshold voltage may depend on an effect of the air conveying apparatus 12.

The controller 10 may comprise or be connected to one or more processors, integrated circuits, memory units, sensors, and/or voltage detectors, such that the controller 10 can determine a voltage supplied to the vehicle ambient air purification arrangement 1 and a combustion engine 3 status. For example, the controller 10 may be connected to an engine control module and/or a powertrain control module. Hereby signals indicative of an engine status may be communicated between the combustion engine 3 and the controller 10.

A voltage exceeding a threshold voltage may be supplied e.g., if the vehicle 2 or the arrangement 1 is supplied with electricity from an electricity supply source 4. Such electricity supply source may be a power grid 4a, a power generator of any kind and/or a battery.

The controller 10 is arranged to control the air conveying apparatus 12 to convey ambient air through the ducts and one or more filters 8 of the exhaust gas treatment system when the combustion engine 3 is inoperative and the supplied voltage exceeds a threshold voltage. Hereby the vehicle ambient air purification arrangement 1 is arranged to purify the air ambient to a vehicle 2 e.g., when the vehicle 2 is parked. The controller 10 may be configured to control the air conveying apparatus 12 to convey ambient air through the filters 8 continuously or discontinuously. For example, the controller may be configured to activate the air conveying apparatus 12 to convey ambient air as long as electricity is supplied or in pre-determined cycles. In some embodiments the ambient air purification arrangement 1 comprises detection means, arranged to detect the amount of particulates in the ambient air. The controller 10 may then control the air conveying apparatus 12 to convey ambient air through the ducts and filter 8 when it is detected that the amount of particulates in the air exceeds a threshold amount of particulates.

In some embodiments, the controller 10 is arranged to activate the air conveying apparatus 12 if it is determined that the arrangement 1 is connected to the power grid 4a. In some embodiments the controller 10 is connected to an electric hybrid system comprising at least one battery which is chargeable via the power grid 4a. The controller 10 may then be arranged to activate the air conveying apparatus 12 if it is determined that the at least one battery is being charged.

According to some embodiments, the controller 10 is connected to an electric hybrid system comprising a solar power generator 4b, arranged to convert solar energy into electrical energy. The solar power generator 4b may comprise or be connected to solar panels/solar cells. According to some embodiments, the controller 10 is connected to an electric hybrid system comprising a wind power generator 4c which is arranged to convert wind energy into electrical energy. The wind power generator 4c may comprise or be connected to one or more parts that may be but in motion by the wind such that electricity will be generated by that motion.

The electric hybrid system may comprise at least one battery which is chargeable via the power generator. The controller 10 may then activate the air conveying apparatus 12 if it is determined that the at least one battery is being charged.

The filter 8 may be a particulate filter 8a, such as a ceramic particulate filter. Such particulate filter 8a may be arranged to collect at least a part of particulates and/or air particles in the exhaust gas from the host vehicle combustion engine 3 and/or ambient air. A ceramic particulate filter may be made of a ceramic substrate such as Aluminum Titanate (TiAl2O5), Silicone Carbide (SiC), Cordierite, Silicon Nitride and/or Acicular Mullite. The particulate filter may be treated with a coating such as a coating made of an inert metal. For example, the coating may comprise a platinum-group-metal. Hereby catalytic regeneration of the particulate filter may be facilitated. The particulate filter 8a may be arranged with a honeycomb-like structure with alternate passages blocked. The particulate filter 8a may also be arranged as a "flow through"-filter, in which particulates may be collected in small pockets in walls within the filter. According to some embodiments the particulate filter 8a may be an electrically regenerable particulate filter.

The particulate filter 8a may comprise pores through which air may flow. Filtration properties may depend on the layout of the physical layout of the particulate filter 8a and on the size of the pores. Particulates may also be referred to as fine particles, particulate matter and/or atmospheric particulate matters. Particles with a diameter of 10 micrometers or less are often referred to as PM10 and particles with a diameter of 2.5 micrometers or less are often referred to as PM2.5 or "fine particles". Sources of fine particles include all types of combustion, including combustion engine vehicles, power plants, residential wood burning, forest fires, agricultural burning, industrial processes etc. Some filters may catch particulates with a particulate size of e.g., of a few micrometers or nanometers.

Figure 3:
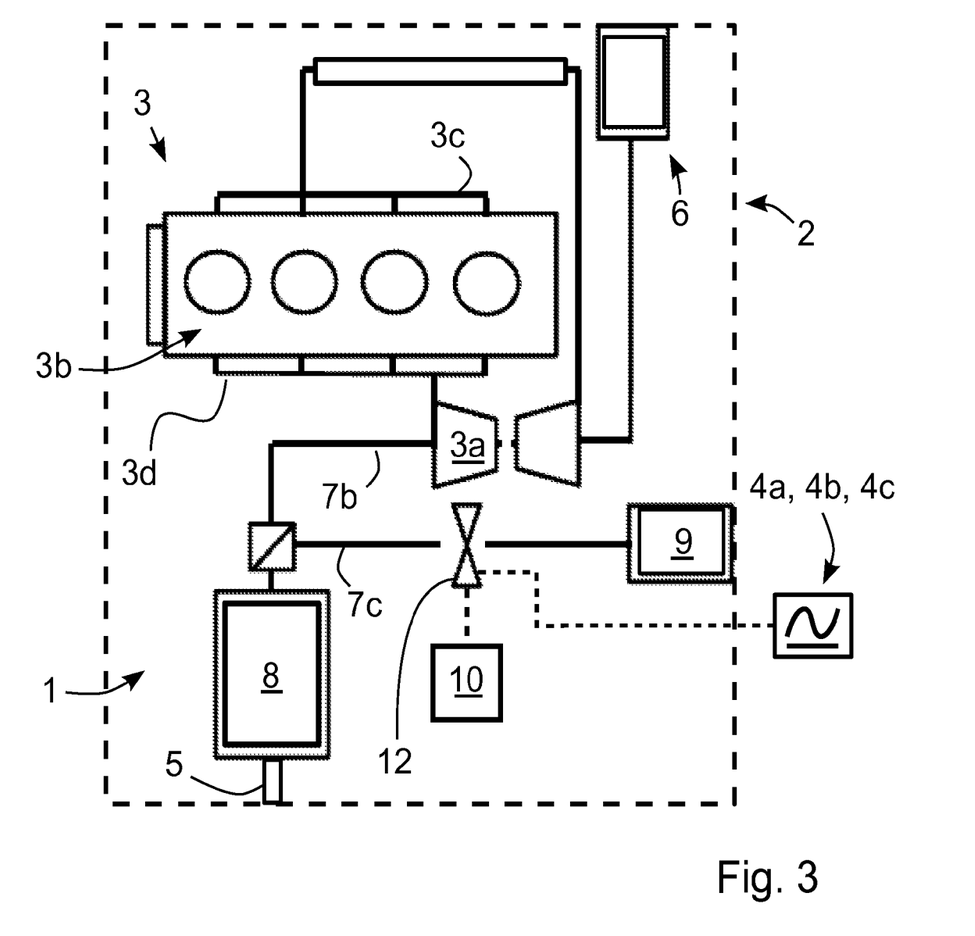
FIG. 3 illustrates a vehicle and a vehicle ambient air purification arrangement according to some further embodiments.

FIG. 3 illustrates a vehicle ambient air purification arrangement 1 according to an alternative embodiment. The arrangement 1 is arranged in a vehicle 2 equipped with a combustion engine 3.

In the FIG. 3 depicted embodiment the arrangement 1 comprises a dedicated air intake 9 which is separated from the air intake 6. The separate dedicated air intake 9 is connected to the air conveying apparatus 12 and the one or more filters 8 via ducts. The separate dedicated air intake 9 allow the arrangement 1 to convey ambient air such that it may be purified in a filter 8 without first being introduced in any combustion engine air intake 6. The separate dedicated air intake 9 may be arranged in any position of the vehicle 2 from where ambient air can be conveyed into a filter 8.

Figure 4:
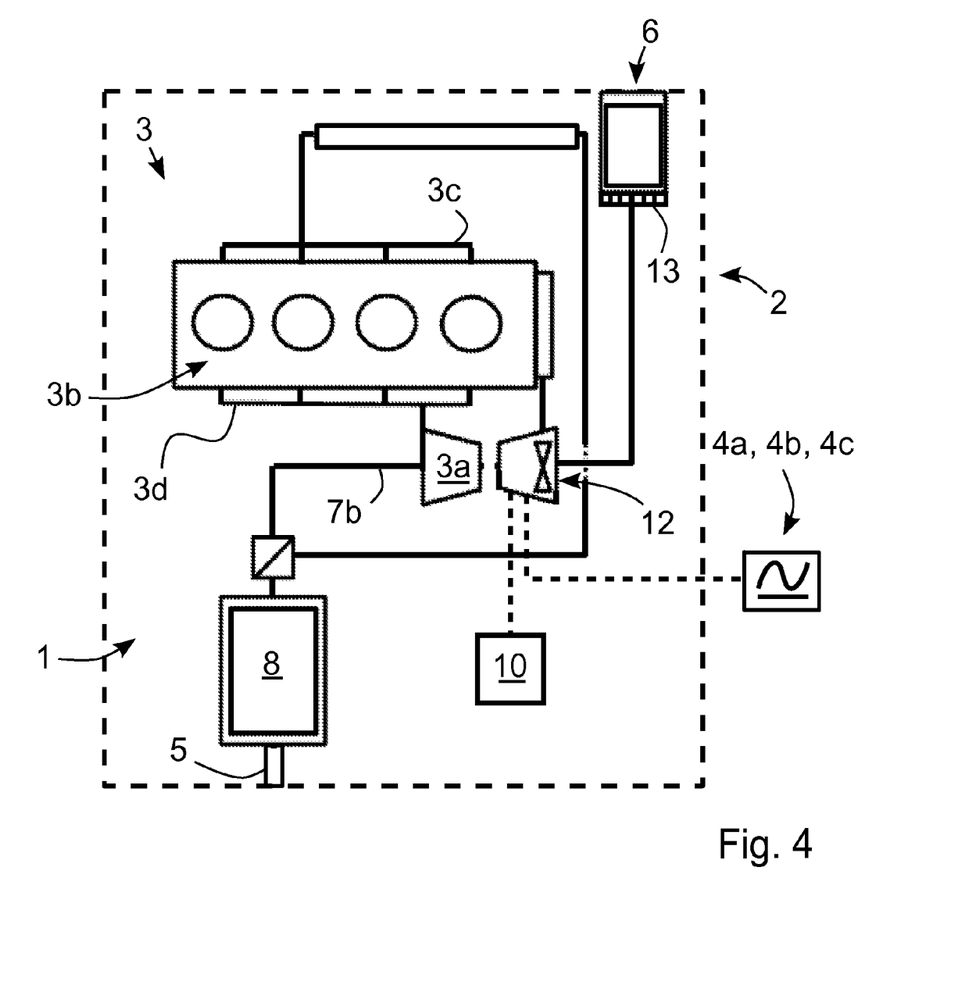
FIG. 4 illustrates a vehicle and a vehicle ambient air purification arrangement according to yet some further embodiments.

In FIG. 4 a vehicle ambient air purification arrangement 1 according to some embodiments is illustrated. The arrangement 1 is arranged in a vehicle 2 equipped with a combustion engine 3.

The arrangement 1 comprises an air conveying apparatus 12 in form of a supercharger and/or turbocharger 3a which may be electrically driven/controlled. The supercharger/turbocharger 3a may directly or indirectly be connected to the controller 10 and an electricity supply source 4. The controller 10 may control activation/deactivation of the supercharger/turbocharger 3a. Thus, the supercharger/turbocharger 3a may convey air through the ducts and filter 8 of the arrangement 1.

As in embodiments described above, the controller 10 is arranged to determine whether the combustion engine 3 is inoperative or not, and arranged to determine a voltage supplied to the arrangement 1 from an electricity supply source 4. The controller 10 is arranged to control the air conveying apparatus 12 in form of the supercharger/turbocharger 3a to convey ambient air through the ducts and filters 8 in response to a determination that the combustion engine 3 is inoperative and that a voltage supplied to the arrangement 1 exceeds a threshold voltage. Hereby no separate air conveying apparatus 12 is necessary.

According to some embodiments the arrangement 1 may further comprises a separate dedicated particle separator 13 arranged between the air intake 6 and the particulate filter 8. The separate dedicated particle separator 13 may for example be arranged within a portion of the air intake 6, in a duct between the air intake 6 and a valve 11/combustion engine 3/air conveying apparatus 12. The separate dedicated particle separator 13 may collect some particles in the air before they are conveyed into the ducts and filters 8 of the arrangement 1. The particle separator 13 may be arranged as an air filter, cyclone and/or centrifuge which may separate particles such as sand and dust before they reach a regenerable particulate filter 8a. Hereby sand and other non-regenerable objects are prevented from reaching the particulate filter 8a.

Figure 5:
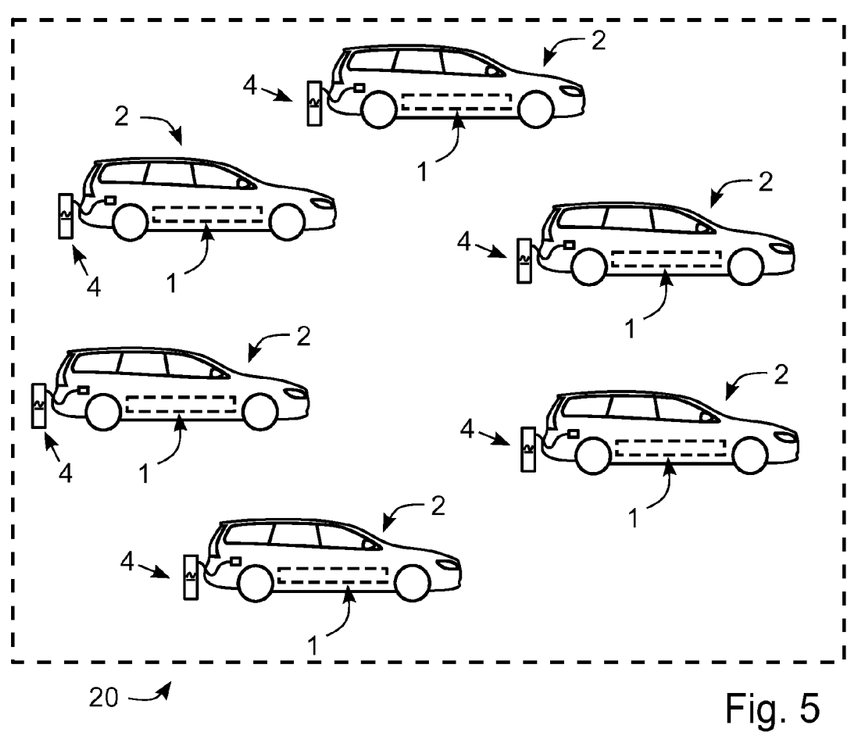
FIG. 5 illustrates a vehicle fleet with a plurality of vehicles, each comprising a vehicle ambient air purification arrangement.

FIG. 5 illustrates a vehicle fleet 20 arranged to clean air which is ambient to the vehicles 2 within the vehicle fleet 20. The vehicle fleet 20 comprises a plurality of vehicles 2 each equipped with a vehicle ambient air purification arrangement 1 according to embodiments described herein. The vehicles 2 within the vehicle fleet 20 may collectively purify air in an area such as a street, neighborhood, city or country. Controllers in the vehicles may be connected to a common server, cloud or the like, such that a status of the controllers can be monitored and/or changed. Hereby vehicle ambient air purification arrangements 1 in vehicles 2 within the vehicle fleet 20 may be remotely controlled.

Figure 6:
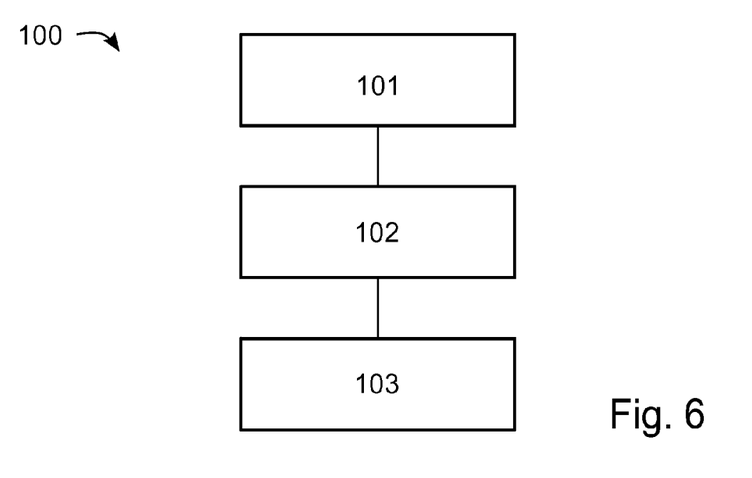
FIG. 6 illustrates a method for purifying air ambient to a vehicle.

FIG. 6 illustrates a method 100 for purifying air ambient to a vehicle by a vehicle ambient air purification arrangement in a vehicle comprising a combustion engine and an associated exhaust gas treatment system having ducts and one or more filters therein for purification of exhaust gas. The arrangement comprises an air conveying apparatus and a controller.

The method 100 comprises: Determining 101, by the controller, that the combustion engine is inoperative, determining 102, by the controller, that a voltage supplied to the arrangement exceeds a threshold voltage and controlling 103 the air conveying apparatus to convey ambient air through the ducts and filters of the exhaust gas treatment system if the combustion engine is inoperative and the voltage supplied to the arrangement exceeds a threshold voltage.

Although the aspects has been described with reference to non-limiting embodiments, many different alterations, modifications and the like will become apparent for those skilled in the art. For example, a valve 11 described in the FIG. 2 embodiment may be arranged in other embodiments. The separate dedicated air intake 9 described in the FIG. 3 embodiment may also be used in the FIG. 2 and FIG. 4 embodiments. Any air conveying apparatus 12 and/or separate particle separator 13 described above may be used in any of the above embodiments. Additionally, other features of various implementing embodiments may be combined to form further embodiments of the invention.

What is claimed is:

1. A vehicle ambient air purification arrangement for use in a vehicle including a combustion engine and an associated exhaust gas treatment system having ducts and one or more filters therein for purification of exhaust gas, the vehicle ambient air purification arrangement comprising:
    an air conveying apparatus separate from the combustion engine; and
    a controller to control the air conveying apparatus to convey ambient air through the ducts and the one or more filters of the exhaust gas treatment system in response to a determination that the combustion engine is inoperative and that a voltage supplied to the arrangement exceeds a threshold voltage upon determining that the arrangement or the vehicle is supplied with electricity from an electrical supply source located outside of the vehicle, so that the one or more filters collect particles in the ambient air when the ambient air is conveyed through the one or more filters.

2. The vehicle ambient air purification arrangement according to claim 1 wherein the controller further is configured to determine if the electrical supply source comprises a power grid, and to activate the air conveying apparatus if it is determined that the arrangement or the vehicle is connected to the power grid.

3. The vehicle ambient air purification arrangement according to claim 1 wherein the controller is connectable to an electric hybrid system comprising at least one battery that is chargeable via a power grid, wherein the electrical supply source comprises the power grid, and wherein the controller is configured to activate the air conveying apparatus if it is determined that the at least one battery is being charged.

4. The vehicle ambient air purification arrangement according to claim 1 wherein the controller is connectable to an electric hybrid system comprising:
    at least one of a solar power generator arranged to convert solar energy into electrical energy and a wind power generator arranged to convert wind energy into electrical energy; and
    at least one battery that is chargeable via the at least one of the solar power generator and the wind power generator;
    wherein the controller is configured to activate the air conveying apparatus if it is determined that the at least one battery is being charged, and wherein the electrical supply source comprises the at least one of the solar power generator and the wind power generator.

5. The vehicle ambient air purification arrangement according to claim 1 further comprising a dedicated air intake.

6. The vehicle ambient air purification arrangement according to claim 1 wherein the air conveying apparatus comprises a supercharger or a turbocharger.

7. The vehicle ambient air purification arrangement according to claim 1 wherein the vehicle further comprises at least one air intake and at least one air outlet;
    wherein the one or more filters include a particulate filter arrangeable between the at least one air intake and the at least one air outlet;
    and wherein the air conveying apparatus is arrangeable between the at least one air intake and the at least one air outlet, and the controller is configured to control the air conveying apparatus to convey the ambient air through the exhaust gas treatment system from the at least one air intake to the at least one air outlet through the particulate filter.

8. The vehicle ambient air purification arrangement according to claim 7 further comprising a valve arrangeable between the air intake and the particulate filter, wherein the controller is configured to selectively control the valve to let the ambient air from the air intake flow through the particulate filter either via the combustion engine, or via a duct which is arranged to bypass the combustion engine.

9. The vehicle ambient air purification arrangement according claim 7 further comprising a dedicated particle separator arrangeable between the at least one air intake and the particulate filter.

10. A vehicle comprising:

a combustion engine;

an exhaust gas treatment system associated with the combustion engine and having ducts and one or more filters therein for purification of exhaust gas; and a vehicle ambient air purification arrangement including an air conveying apparatus separate from the combustion engine and a controller to control the air conveying apparatus to convey ambient air through the ducts and the one or more filters of the exhaust gas treatment system in response to a determination that the combustion engine is inoperative and that a voltage supplied to the arrangement exceeds a threshold voltage upon determining that the vehicle is supplied with electricity from an electrical supply source located outside of the vehicle, so that the one or more filters collect particles in the ambient air when the ambient air is conveyed through the one or more filters.

11. The vehicle according to claim 10 wherein the controller further is configured to determine if the electrical supply source comprises a power grid, and to activate the air conveying apparatus if it is determined that the vehicle is connected to the power grid.

12. The vehicle according to claim 10 wherein the controller is connected to an electric hybrid system comprising at least one battery that is chargeable via a power grid, wherein the electrical supply source comprises the power grid, and wherein the controller is configured to activate the air conveying apparatus if it is determined that the at least one battery is being charged.

13. The vehicle according to claim 10 wherein the controller is connectable to an electric hybrid system comprising:

at least one of a solar power generator arranged to convert solar energy into electrical energy and a wind power generator arranged to convert wind energy into electrical energy; and at least one battery that is chargeable via the at least one of the solar power generator and the wind power generator;

wherein the controller is configured to activate the air conveying apparatus if it is determined that the at least one battery is being charged, and wherein the electrical supply source comprises the at least one of the solar power generator and the wind power generator.

14. The vehicle according to claim 10 wherein the vehicle ambient air purification arrangement further comprises a dedicated air intake.

15. The vehicle according to claim 10 further comprising:

at least one air intake and at least one air outlet;

wherein the one or more filters include a particulate filter arranged between the at least one air intake and the at least one air outlet; and wherein the air conveying apparatus is also arranged between the at least one air intake and the at least one air outlet, and the controller is configured to control the air conveying apparatus to convey the ambient air through the exhaust gas treatment system from the at least one air intake to the at least one air outlet through the particulate filter.

16. The vehicle according to claim 15 wherein the particulate filter is a ceramic particulate filter.

17. The vehicle according to claim 15 wherein the vehicle ambient air purification arrangement further comprises a valve arranged between the air intake and the particulate filter, wherein the controller is configured to selectively control the valve to let the ambient air from the air intake flow through the particulate filter either via the combustion engine, or via a duct which is arranged to bypass the combustion engine.

18. The vehicle according claim 15 wherein the vehicle ambient air purification arrangement further comprises a dedicated particle separator arranged between the at least one air intake and the particulate filter.

19. A vehicle fleet comprising a plurality of vehicles according to claim 10, wherein the vehicles are configured to clean air that is ambient to the vehicles.

20. A method for purifying ambient air by a vehicle ambient air purification arrangement in a vehicle, wherein the vehicle further comprises a combustion engine and an associated exhaust gas treatment system having ducts and one or more filters therein for purification of exhaust gas, and wherein the arrangement comprises an air conveying apparatus separate from the combustion engine and a controller, the method comprising:

determining, by the controller, whether the combustion engine is inoperative;

determining, by the controller, whether a voltage supplied to the arrangement exceeds a threshold voltage upon determining that the vehicle is supplied with electricity from an electrical supply source located outside of the vehicle;

controlling the air conveying apparatus to convey ambient air through the ducts and the one or more filters of the exhaust gas treatment system if the combustion engine is inoperative and the voltage supplied to the arrangement exceeds the threshold voltage; and collecting, by the one or more filters, particles in the ambient air when the ambient air is conveyed through the one or more filters.

21. The method according to claim 20 further comprising detecting amount of particulates in the ambient air, and controlling the air conveying apparatus to convey the ambient air through the ducts and the one or more filters when the amount of particulates in the ambient air exceeds a threshold amount of particulates.

* * * * *